(12) United States Patent
Chandraker et al.

(10) Patent No.: US 10,706,582 B2
(45) Date of Patent: Jul. 7, 2020

(54) REAL-TIME MONOCULAR STRUCTURE FROM MOTION

(71) Applicant: NEC Laboratories America, Inc., Princeton, NJ (US)

(72) Inventors: Manmohan Chandraker, Santa Clara, CA (US); Shiyu Song, Sunnyvale, CA (US)

(73) Assignee: NEC Corporation, Tokyo (JP)

( * ) Notice: Subject to any disclaimer, the term of this patent is extended or adjusted under 35 U.S.C. 154(b) by 125 days.

(21) Appl. No.: 15/965,480

(22) Filed: Apr. 27, 2018

(65) Prior Publication Data

US 2018/0247429 A1 Aug. 30, 2018

Related U.S. Application Data

(63) Continuation-in-part of application No. 13/858,041, filed on Apr. 6, 2013, now abandoned.

(60) Provisional application No. 61/725,733, filed on Nov. 13, 2012, provisional application No. 61/701,877, filed on Sep. 17, 2012.

(51) Int. Cl.
*G06T 7/73* (2017.01)
*G06T 7/277* (2017.01)
*G05D 1/02* (2020.01)
*G06K 9/66* (2006.01)
*G06K 9/00* (2006.01)
*G05D 1/00* (2006.01)
*G06T 7/579* (2017.01)

(52) U.S. Cl.
CPC ............. *G06T 7/74* (2017.01); *G05D 1/0088* (2013.01); *G05D 1/0251* (2013.01); *G05D 1/0253* (2013.01); *G06K 9/00798* (2013.01); *G06T 7/277* (2017.01); *G06T 7/579* (2017.01); *G06T 7/73* (2017.01); *G05D 2201/0213* (2013.01); *G06K 9/00664* (2013.01); *G06K 9/00791* (2013.01); *G06T 2207/10012* (2013.01); *G06T 2207/10016* (2013.01); *G06T 2207/20081* (2013.01); *G06T 2207/20164* (2013.01); *G06T 2207/30244* (2013.01); *G06T 2207/30252* (2013.01); *G06T 2207/30256* (2013.01)

(58) Field of Classification Search
None
See application file for complete search history.

(56) References Cited

PUBLICATIONS

J. Arrospide L. Salgado M. Nieto R. Mohedano, "Homography-based ground plane detection using a single on-board camera," IET Intell. Transp. Syst., 2010, vol. 4, Iss. 2, pp. 149-160. (Year: 2010).*
I.Markelic, et.al., "The Driving School System: Learning Basic Driving Skills From a Teacher in a Real Car," IEEE Transactions on Intelligent Transportation Systems, vol. 12, No. 4, Dec. 2011. (Year: 2011).*

(Continued)

*Primary Examiner* — Mikhail Itskovich
(74) *Attorney, Agent, or Firm* — Joseph Kolodka

(57) ABSTRACT

Systems and methods are described for multithreaded navigation assistance by acquired with a single camera on-board a vehicle, using 2D-3D correspondences for continuous pose estimation, and combining the pose estimation with 2D-2D epipolar search to replenish 3D points.

18 Claims, 13 Drawing Sheets

(56) References Cited

PUBLICATIONS

Paul Wohlhart, Peter M. Roth, and Horst Bischof 3D Camera Tracking in Unknown Environments by On-line Keypoint Learning "" Computer Vision Winter Workshop 2010, Libor Spacek, Vojtech Franc (eds.) Nove Hrady, Czech Republic, (Feb. 3-5, 2010).*

Geiger, et al., "StereoScan: Dense 3d Reconstruction in Real-time", Dense 3D reconstruction in real-time, in IEEE Intelligent Vehicles Symposium, Jun. 2011, 6 pages.

Hansen, et al., "Monocular visual odometry for robot localization in LNG pipes," in ICRA, May 2011, 6 pages.

Klein, et al., "Parallel tracking and mapping for small AR workspaces," in ISMAR, Nov. 2007, 10 pages.

Rosten, et al., "Faster and better: A machine learning approach to corner detection," PAMI, pp. 105-119, vol. 32, Jan. 2010.

Scaramuzza, et al., "Real-time monocular visual odometry for on-road vehicles with 1-point ransac," in ICRA, May 2009, pp. 488-494.

Royer, et al., "Outdoor autonomous navigation using monocular vision," in IROS, Aug. 2005, pp. 3395-3400.

Open CV: "ORB (Oriented FAST and Rotated BRIEF)", available at: https://docs.opencv.org/3.0-beta/doc/py_tutorials/py_feature2d/py_orb/py_orb.html, last downloaded Apr. 27, 2018, 3 pages.

Sba : A Generic Sparse Bundle Adjustment C/C++ Package Based on the Levenberg-Marquardt Algorithm, available at: http://users.ics.forth.gr/~lourakis/sba/, last downloaded Apr. 27, 2018, 2 pages.

Open CVS: "FAST Algorithm for Corner Detection", availabel at: https://docs.opencv.org/3.0-beta/doc/py_tutorials/py_feature2d/py_fast/py_fast.html, last downloaded Apr. 27, 2018, 4 pages.

* cited by examiner

Pose Module

101

The pose module has the following functions:

(a) Detection:
 (i) detect features (we use FAST corners, minimum 500 and maximum 1000 are extracted)
 (ii) compute ORB descriptors (b) Pose-guided Matching (PGM):
 (i) predict the pose based on the previous frame's velocity
 (ii) project the stable set of 3D points into the current frame using the motion model and compare the ORB descriptors in a small circle of radius r_s (= 20 pixels)

(c) Pose Estimation (PnP):
 (i) use PnP algorithm to compute the camera pose in a robust RANSAC framework
 (ii) perform nonlinear refinement to optimize the pose.

FIG. 3

Local Bundle Adjustment Module

103

LBA: Refine 3D points and camera poses in a sliding window of N_b = 10 frames.

Data structure: frame cache
Stores feature locations, descriptors, camera poses of most recent N_b frames Novel data structure: match cache
List of tables, one element of list corresponding to each frame
Key into table is identity of 3D point, stored entry is identity of 2D feature.
Allows fast access to insert or delete 3D points in the map.

R: Re-find 3D points that are lost due to tracking errors
Pose highly accurate after LBA, so search for projected match in tight radius of r_f = 10 pixels.

U_MM: Update the motion model to perform PGM in the next frame.

FIG. 5

Ground Plane Estimation With 3D Points      301

1. Detect FAST corners in a region of interest in the immediate foreground (middle third of the lower half of the image).
2. Match using ORB descriptors to similar region in the previous image.
3. Perform triangulation to recover the 3D location (x, y, z) of these feature matches.
4. Height of a 3D point = $y \cos(p) - z \sin(p)$, where p = camera pitch angle (known).
5. Robust 1-point RANSAC to estimate ground plane height:
   (a) For every 3D point
   (b) height of point is h0, initialize sum = 0
   (c) For all other 3D points, find h - h0
   (d) sum = sum + exp(-50 * (h - h0))
6. Return height of point with largest sum.

FIG. 8

Ground Plane Estimation With Guided Dense Stereo    302

1. To compute height h and surface normal n = (n1, n2, n3)

2. Initialize h to height from method in 301, n1 to cos(p), n3 to -sin(p)
   (n2 is determined by n1 and n3, using unit norm of n)

3. Cost function computation:
   (a) Given any hypothesized h, n1, n3, compute homography between frames at time t and t+1
   $H = R + (1/h) tn^T$, where (R, t) is the relative camera pose (b) Map pixels in frame t to frame t+1
   (c) Bilinear interpolation for subpixel accurate values
   (d) Compute sum of absolute values of intensity difference, SAD, between left and right frame.

4. Use Nelder-Mead simplex method to optimize for h, n1 and n3.

FIG. 9

Real-Time Lane Detection

400

1. Sobel filter to find edge map.
2. Hough transform to extract line segments.
3. For every pixel p on the line segment in frame t
   (a) compute epipolar line in frame t+1
   (b) find intersection pixel q with corresponding line segment in frame t+1
   (c) compute normalized cross-correlation between pixels p and q
4. Add the NCC scores for every line segment. Maximum score gives the match.
5. Cluster line segments in similar orientations into lanes.
6. Find 3D equation of lanes using camera poses at frames t and t+1.
7. Find best fit plane through the 3D lines, this gives another estimate of ground plane.
8. Return height of ground plane from camera.

FIG. 10

REAL-TIME MONOCULAR STRUCTURE FROM MOTION

RELATED APPLICATION INFORMATION

This application claims priority to Provisional Application Ser. No. 61/701,877, filed on Sep. 17, 2012, and Ser. No. 61/725,733, filed on Nov. 13, 2012, and U.S. patent application Ser. No. 13/858,041, filed on Apr. 6, 2013, the content of which is incorporated by reference.

BACKGROUND

Technical Field

The present invention relates to autonomously driving a vehicle, and more particularly to autonomously controlling real-time navigation of a vehicle using monocular structure from motion (SFM).

Description of the Related Art

Autonomous driving faces unique challenges as a difficult corner case for SFM. Traditional systems for unordered image collections are inapplicable in such situations, since fundamentally, forward motion is an ill-posed situation. This is compounded by the fact that high vehicle speeds lead to rapidly changing imagery, so successful indoor systems like that rely on repeated observations of the same scene elements also break down. Further, the timing demands on autonomous driving systems are extremely stringent—a reliable camera pose is expected at every frame, with no luxury of delayed verifications or bundle adjustments.

While stereo Simultaneous Localization And Mapping (SLAM) systems routinely achieve high accuracy and real-time performance, the challenge remains daunting for monocular ones. Yet, monocular systems are attractive for the automobile industry since they are cheaper and the calibration effort is lower. Costs of consumer cameras have steadily declined in recent years, but cameras for practical visual odometry in automobiles are expensive since they are produced in lesser volume, must support high frame rates and be robust to extreme temperatures, weather and jitters.

The challenges of monocular visual odometry for autonomous driving are both fundamental and practical. For instance, it has been observed empirically and theoretically that forward motion with epipoles within the image is a "high error" situation for SFM. Vehicle speeds in outdoor environments can be high, so even with cameras that capture imagery at high frame rates, large motions may occur between consecutive frames. This places severe demands on an autonomous driving visual odometry system, necessitating extensive validation and refinement mechanisms that conventional systems do not require. The timing requirements for visual odometry in autonomous driving are equally stringent—a pose must be output at every frame in a fixed amount of time. For instance, traditional systems may produce a spike in timings when keyframes are added, or loop closure is performed.

SUMMARY

According to an aspect of the present principles, a system is provided for autonomous vehicular navigation. The system includes a multithreaded processor coupled to a non-transitory computer-readable storage medium. The processor is configured for acquiring images using a single camera positioned on-board a vehicle, estimating camera motion using monocular structure from motion (SFM) by performing continuous camera pose estimation of 2D-3D correspondences, detecting a local planarity of a road and correcting for scale drift based on the camera pose estimation, and determining visual odometry correspondences and replenishing 3D points of the images by combining the pose estimation with a 2D-2D multi-threaded epipolar search. The determining of the visual odometry is performed by parallelizing the epipolar search across a plurality of threads, performing, in real-time, the pose estimation at each of a plurality of frames using all of the threads, validating the 3D points among intermediate points and retaining validated 3D points for insertion of new 3D points in a main thread. An optimal planar homography mapping between a road in two frames is determined based on one or more determined ground estimation cues, per-frame relative importances of the cues are determined by computing observation covariances for each of the cues to perform ground plane estimation. Driving functions of the vehicle are autonomously controlled based on the determined visual odometry and the local planarity of the road.

According to another aspect of the present principles, a method is provided for autonomous vehicular navigation. The method includes acquiring, using a processor coupled to a non-transitory computer-readable storage medium, images using a single camera positioned on-board a vehicle, estimating camera motion using monocular structure from motion (SFM) by performing continuous camera pose estimation of 2D-3D correspondences, detecting a local planarity of a road and correcting for scale drift based on the camera pose estimation, and determining visual odometry correspondences and replenishing 3D points of the images by combining the pose estimation with a 2D-2D multi-threaded epipolar search. The determining of the visual odometry is performed by parallelizing the epipolar search across a plurality of threads, performing, in real-time, the pose estimation at each of a plurality of frames using all of the threads, validating the 3D points among intermediate points and retaining validated 3D points for insertion of new 3D points in a main thread. An optimal planar homography mapping between a road in two frames is determined based on one or more determined ground estimation cues, per-frame relative importances of the cues are determined by computing observation covariances for each of the cues to perform ground plane estimation. Driving functions of the vehicle are autonomously controlled based on the determined visual odometry and the local planarity of the road.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 3 shows an exemplary epipolar constrained search, in accordance with the present principles;

FIG. 5 shows an exemplary multithreaded keyframe architecture to handle insertion of new 3D points in the main thread, in accordance with the present principles;

FIG. 8 shows in more details a process for ground plane estimation with 3D points 301, in accordance with the present principles;

FIG. 9 shows an exemplary process for ground plane estimation with guided dense stereo, in accordance with the present principles;

FIG. 10 shows an exemplary process for real-time lane detection, in accordance with the present principles;

DETAILED DESCRIPTION OF PREFERRED EMBODIMENTS

Figure 1:
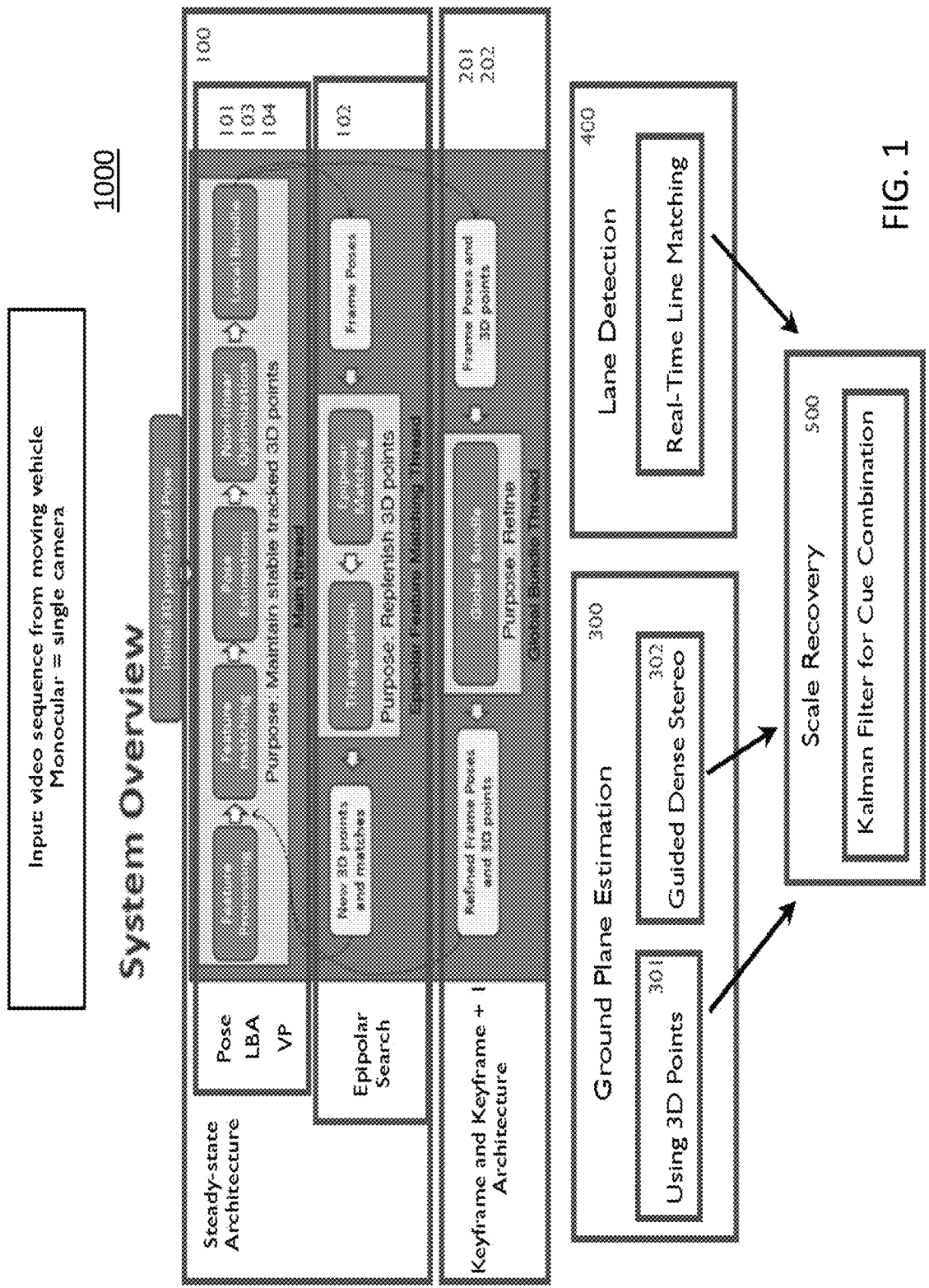
FIG. 1 shows an exemplary multithreaded architecture with 2D-3D correspondences for continuous pose estimation, in accordance with the present principles.

In accordance with the present principles, systems and methods are provided for autonomously controlling real-time navigation of a vehicle (e.g., driving a vehicle on a road) using monocular structure from motion (SFM).

In one embodiment, systems and methods are disclosed for autonomously controlling navigation of a vehicle using multithreaded visual odometry by processing data acquired with a single camera on-board a vehicle, using 2D-3D correspondences for continuous pose estimation, and combining the pose estimation with 2D-2D epipolar search to replenish 3D points in accordance with various embodiments of the present principles.

In another aspect, an accurate, robust and real-time large-scale SFM system for real-world autonomous outdoor driving application is disclosed. The system uses multithreaded architectures for SFM that allow handling large motions and rapidly changing imagery for fast-moving vehicles. The system includes parallel epipolar search for extensive validation of feature matches over long tracks and a keyframe architecture that allows insertion at low cost. This allows robust operation of the system at 30 fps on the average, with output guaranteed at every frame within 50 ms. To resolve the scale ambiguity of monocular SFM, the system estimates the height of the ground plane at every frame. Cues for ground plane estimation include triangulated 3D points and plane-guided dense stereo matching. These cues are combined in a flexible Kalman filtering framework, which is trained rigorously to operate with the correct empirical covariances.

Advantages of the above aspect may include at least one or more of the following. The system makes judicious use of a multithreaded design to ensure that motion estimates (and the underlying structure variables) become available only after extensive validation with long-range constraints and thorough bundle adjustments, but without delay. Thus, the system is optimized for worst-case timing scenarios, rather than the average-case optimization for most traditional systems. In particular, the multithreaded system produces pose outputs in at most 50 ms, regardless of whether a keyframe is added or scale correction performed. The average frame rate of the system is much higher, at above 30 fps.

The system provides a real-time, accurate, large-scale monocular visual odometry system for real-world autonomous outdoor driving applications. The architecture of the system addresses the challenge of robust multithreading even for scenes with large motions and rapidly changing imagery. The design is extensible for three or more parallel CPU threads. The system uses 3D-2D correspondences for robust pose estimation across all threads, followed by local bundle adjustment in the primary thread. In contrast to prior work, epipolar search operates in parallel in other threads to generate new 3D points at every frame. This significantly boosts robustness and accuracy, since only extensively validated 3D points with long tracks are inserted at keyframes. Fast-moving vehicles also necessitate immediate global bundle adjustment, which is triggered by the instant keyframe design in parallel with pose estimation in a thread-safe architecture. Operating in parallel during the epipolar search further provides increased flexibility, accuracy, and speed during the search, and provides for a decrease in processing requirements over any conventional systems and/or methods for performing such an epipolar search. To handle inevitable tracking failures, a recovery method is provided. Scale drift is corrected using a mechanism that detects (rather than assumes) local planarity of the road by combining information from triangulated 3D points and the inter-image planar homography. The system is optimized to output pose within 50 ms in the worst case, while average case operation is over 30 fps. Evaluations are presented on the challenging KITTI dataset for autonomous driving, where the system achieves better rotation and translation accuracy than other systems.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While stereo-based SFM is commonly available in commercial products, the lack of a fixed baseline renders monocular SFM a far more daunting challenge. Yet, the monocular SFM is cost-effective in mass production, thus, an attractive proposition for the autonomous driving industry.

Referring now in detail to the figures in which like numerals represent the same or similar elements and initially to FIG. 1, an exemplary multithreaded architecture with 2D-3D correspondences for continuous pose estimation is illustratively depicted in accordance with one embodiment of the present principles.

In one embodiment, a system/method 1000 for autonomous vehicle navigation using monocular structure from motion (SFM), with performance equal to or better than that of stereo SFM systems, is illustratively depicted in accordance with the present principles. To meet the competing demands of accuracy and timing, the system design entails a multithreaded architecture. Camera poses are determined using 2D-3D correspondences, where a dedicated epipolar search thread continually updates candidate 3D points. A keyframe design ensures that the epipolar search supplies long range constraints to a bundle adjustment module operating in parallel. This allows the system to utilize only points that have undergone extensive validation and output refined poses in real-time, at every frame—in contrast to browsing systems like PTAM that perform epipolar search on-demand and delayed refinement.

The monocular SFM handles scale drift, which does not occur in fixed baseline stereo SFM. The most popular SLAM approach for scale correction is loop closure. However, it is impractical for autonomous driving applications, since one cannot rely on the presence of loops in general road conditions. Moreover, applications like scene understanding and driver safety cannot compromise on accuracy or timing between loops closures. The system achieves a high degree of robustness through an extensive, principled scale correction mechanism that relies on real-time estimates of camera height from the ground plane.

Ground plane estimation is itself a challenging problem, due to the lack of reliable texture on the road. The system counters this by combining cues from multiple methods in a rigorously operated, but flexible, Kalman filter framework. The cues used are triangulated 3D points and a dense stereo matching in real-time to find the optimal planar homography mapping between the road in two frames. While each of these methods is unreliable on its own, a well-designed Kalman filter successfully combines them to produce robust estimates. This allows the system to greatly improve and complete the KITTI test sequences with low errors.

An innovation central to the excellent performance of the data fusion is the correct computation of observation covariances—an aspect often overlooked by other SFM systems that use Kalman filters. This is achieved through an extensive training procedure over long distances of real-world driving sequences, that learns relationships between variance in ground plane estimation to the underlying variables for each method. Thus, during the actual operation of the filter, the system predicts meaningful empirical covariances that are combined to produce a reliable ground plane estimate.

FIG. 1 shows an exemplary multithreaded architecture with 2D-3D correspondences for continuous pose estimation. One embodiment is a multithreaded structure-from-motion (SFM) architecture 100. The steady-state architecture 100 includes a pose local bundle adjustment (LBA) system 101/103 and an epipolar search unit 102. The multithreaded architecture uses 2D-3D correspondences for continuous pose estimation in 101/103. This is combined with 2D-2D epipolar search to replenish 3D points. This architecture allows camera pose estimation and 3D reconstruction using fast moving imagery acquired with a single camera on-board a vehicle, thereby enabling autonomous driving applications.

The output of the pose LBA is provided to a keyframe and keyframe+1 unit 201/202. Unit 201 provides a collection and refinding mechanism allows bundle adjustment using long tracks, as opposed to two-view estimations for previous works, while unit 202 handles the keyframe+1 where real-time global bundle adjustment is conducted in a thread-safe architecture with real-time pose estimation.

The system also includes a ground plane estimation unit 300 using 3D points 301 and guided dense stereo information 302. The system also performs lane detection 400 with real time line matching. The result from ground plane estimation and lane detection are provided to a scale recovery 500 that uses a Kalman filter for cue combination in one embodiment.

The multithreaded architecture allows elegant extension to as many threads as desired. Besides speed advantages, multithreading also greatly contributes to the accuracy and robustness of the system. As an example, consider the epipolar contrained search. A single-thread version of a system that relies on 2D-3D correspondences might update its stable point set by performing an epipolar search in the frame preceding a keyframe. However, the support for the 3D points introduced by this mechanism is limited to just the triplet used for the circular matching and triangulation. By moving the epipolar search to a separate thread and performing the circular matching at every frame, the system may supply 3D points with tracks of length up to the distance from the preceding keyframe. Clearly, the set of long tracks provided by the epipolar thread in the multi-thread system is far more likely to be free of outliers.

The above multithreaded architecture for monocular SFM is designed to meet the challenges of autonomous driving. Real-time operation is achieved at 30 fps, with guaranteed refined pose output within 50 ms. Robust scale correction is done by ground plane estimation using multiple cues in a flexible Kalman filter framework. Data fusion is achieved with rigorous, data-driven computation of observation covariances for each cue. The system achieves accuracy that outperforms or rivals state-of-the-art stereo systems in rotation and translation.

Figure 2:
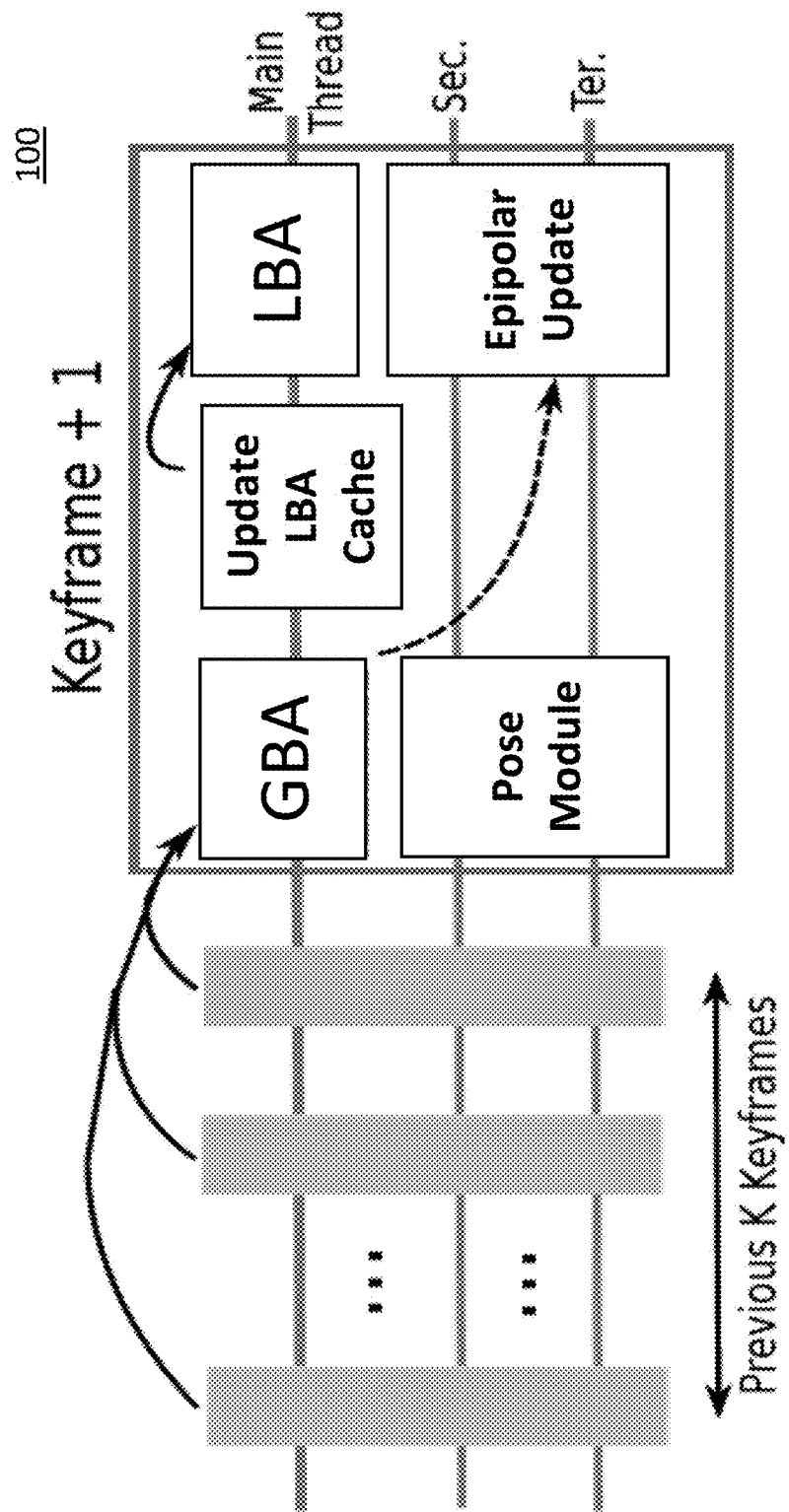
FIG. 2 shows an exemplary pose-guided matching module to provide fast 3D-2D correspondences, in accordance with the present principles.

FIG. 2 shows one exemplary pose-guided matching module 100 (FIG. 1) to provide fast 3D-2D correspondences. At steady state, the system has access to a stable set of 3D points. The poses of the previous frames have undergone multiple non-linear optimizations and are considered accurate. Each frame is processed by three modules: the pose module estimates the pose of the current frame and occupies all available threads; 2) the epipolar update module uses epipolar constrained search (ECS) and triangulation T to prepare new 3d points to be added; and 3) the local bundle adjustment (LBA) unit performs non-linear optimization over a sliding window of a few previous frames and takes place in the main thread.

Pose-guided matching with fast 3D-2D correspondences is supported by the architecture of FIG. 2 for every steady state frame. The modules are depicted in their multithreading arrangement, in correct synchronization order but not to scale. Camera images are provided to a detection module, then provided to a PGM unit for pose-guided matching, and then to a perspective n-point (PnP) pose estimation unit. The outputs of the PnP unit are provided to the LBA unit, then to a finding unit R and an update motion model U. The output of the PnP unit are also provided to an ECS unit for epipolar constrained search and then to a triangulation unit T.

To initialize, the system. With sufficient baseline (around 5 frames), a set of 3D points is initialized by relative pose estimation, triangulation and bundle adjustment. Each frame during initialization is processed within 10 ms.

At steady state, the system has access to a stable set of at least $N_s$ 3D points that have undergone extensive bundle adjustment in prior frames (for $N_s$=100). The preceding poses have also undergone multiple non-linear refinements, so can be considered highly accurate. The system architecture at every frame in steady state operation is illustrated in FIG. 1.

Around 2000 FAST corners with Shi-Tomasi filtering are extracted from a typical outdoors image and ORB descriptors are computed. Using the pose of the previous frame, the pose of the current frame is predicted, assuming constant velocity. The system explicitly computes the camera pose at each frame using correspondences, the motion model is only used as guidance to expedite matching. Using the pose of the previous frame, the pose of the current frame is predicted, assuming constant velocity. The existing set of stable 3D points are projected into the image using the predicted pose and the ORB descriptor for each is compared to those within a square of side $2r_s$ pixels (for example $r_s$=15). Given these 2D-3D point correspondences, the system computes the actual camera pose using perspective n-point (PnP) pose estimation in a RANSAC framework. The particular implementation used is EPnP with a model size of 4 points. The RANSAC pose with the largest consensus set is refined using a Levenberg-Marquardt nonlinear optimization.

The system can easily handle other choices for matching, in particular, it has achieved similar results using normalized cross-correlation (NCC) instead of ORB. But associating a descriptor like ORB with a 3D point can have ancillary benefits.

If the set of 3D points in application scenes remains unchanged, the pose module is enough to maintain camera pose for extended periods. However, unlike small workspace environments, scene points rapidly move out of view in outdoor applications and candidate sets of points usable for pose estimation must be continually updated in a thread of their own (rather than on-demand like PTAM).

For every feature $f_0$ in the most recent keyframe at location $(x_0,y_0)$, a square of side $2r_e$ centered at $(x_0+\Delta x, y_0+\Delta y)$ in frame n is considered. The displacement $(\Delta x, \Delta y)$ is computed based on the distance of $(x_0,y_0)$ from the vanishing point, which is a strong cue in highway sequences, where $\Delta x=(x_0+\Delta x)-x_0$, and $\Delta y=(y_0+\Delta y)-y_0$. This vastly improves the feature matching performance when the vehicle is moving at high speeds.

The ORB descriptors (e.g., unique signature for each feature point) for all FAST corners within the intersection of this square with a rectilinear band p pixels wide centered around the epipolar line corresponding to $f_0$ in frame n are compared with the descriptor for $f_0$. The closest Hamming match, $f_n$, is found. A match is accepted only if there is also a matching feature in frame $f_{n-1}$. Only two matches, (0,n) and (n-1,n), are needed at frame n, since matches (0,n-1) have already been computed for $f_{n-1}$. Parameter values used are p=3 and $r_e=\min\{1200P\omega P^2, 10\}$, where $\omega$ is the differential rotation between frames.

The features matched in frame n are triangulated with respect to the most recent keyframe, which takes about 2 ms per frame. The 3D point is back-projected into all frames 1, ..., n-1 and retained only if a matching ORB descriptor is found within a tight square of side $2r_b$ pixels ($r_b$=3). A two-view triangulation suffices instead of a more expensive multiview alternative, since the long tracks built by a dedicated epipolar search module crucially ensure that only the most reliable 3D points are inserted at keyframes, as described next.

A sliding window bundle adjustment operates in a parallel thread with the epipolar update module. In accordance with various embodiments, bundle adjustment may include taking several images of several 3D points in several cameras, then performing nonlinear optimization to estimate the cameras and 3D points. As described in further detail herein below, a publicly available package SBA may be used in accordance with the present principles.

A frame cache is used for storing feature locations, descriptors, and camera poses for the most recent N frames (N=10). Another new feature of the system is that it forces the previous keyframe to be in the local bundle cache if it is not already present. Since a criterion for keyframes to be added is that the pose has changed significantly, adding the previous keyframe allows the system to produce stable pose results even when the vehicle is not moving (or moving slowly). In the LBA module, the system is also given a chance to re-find 3D points temporarily lost due to artifacts like blur or specularities. The publicly available SBA package [13] is used for bundle adjustment. Timings for epipolar update and local bundle adjustment are summarized in Table 1, below:

TABLE 1

Pose, epipolar update and local bundle module timings in steady state, with the latter two designed to operate in parallel.

| Module | Operation | Timing |
| --- | --- | --- |
| 4*Pose | FAST + Shi-Tomasi | 1 ms |
|  | ORB descriptor | 5 ms |
|  | Pose-guided matching | 1 ms |
|  | PnP (RANSAC, 500 iter.) | 15 ms |
|  | Nonlin. pose refine | 1 ms |
| 2*Epi. Update | Constrained search | 10-15 ms |
|  | Triangulation | 1-3 ms |
| 3*Local Bundle | Windowed bundle adj. | 10-20 ms |
|  | Re-find 3D points | 1 ms |
|  | Update motion model | 0 ms |

The pose module 101 is shown in FIG. 3. As shown in FIG. 3, the pose module has the following functions: detection of features and ORB descriptors; pose-guided matching (PGM); and pose estimation (PnP).

If the application scenario involves scenes where the same set of 3D points is viewed for extended periods of time, then the pose module by itself would be sufficient to maintain the camera pose. However, in outdoor applications like autonomous navigation, 3D scene points rapidly move out of view within a few frames. Thus, the stable set of points used for pose computation must be continually updated, which is the task entrusted to the epipolar search module 102 of FIG. 1. In some embodiments, an epipolar update module (whose function includes performing an epipolar constrained search) does this updating in accordance with the present principles.

Figure 4:
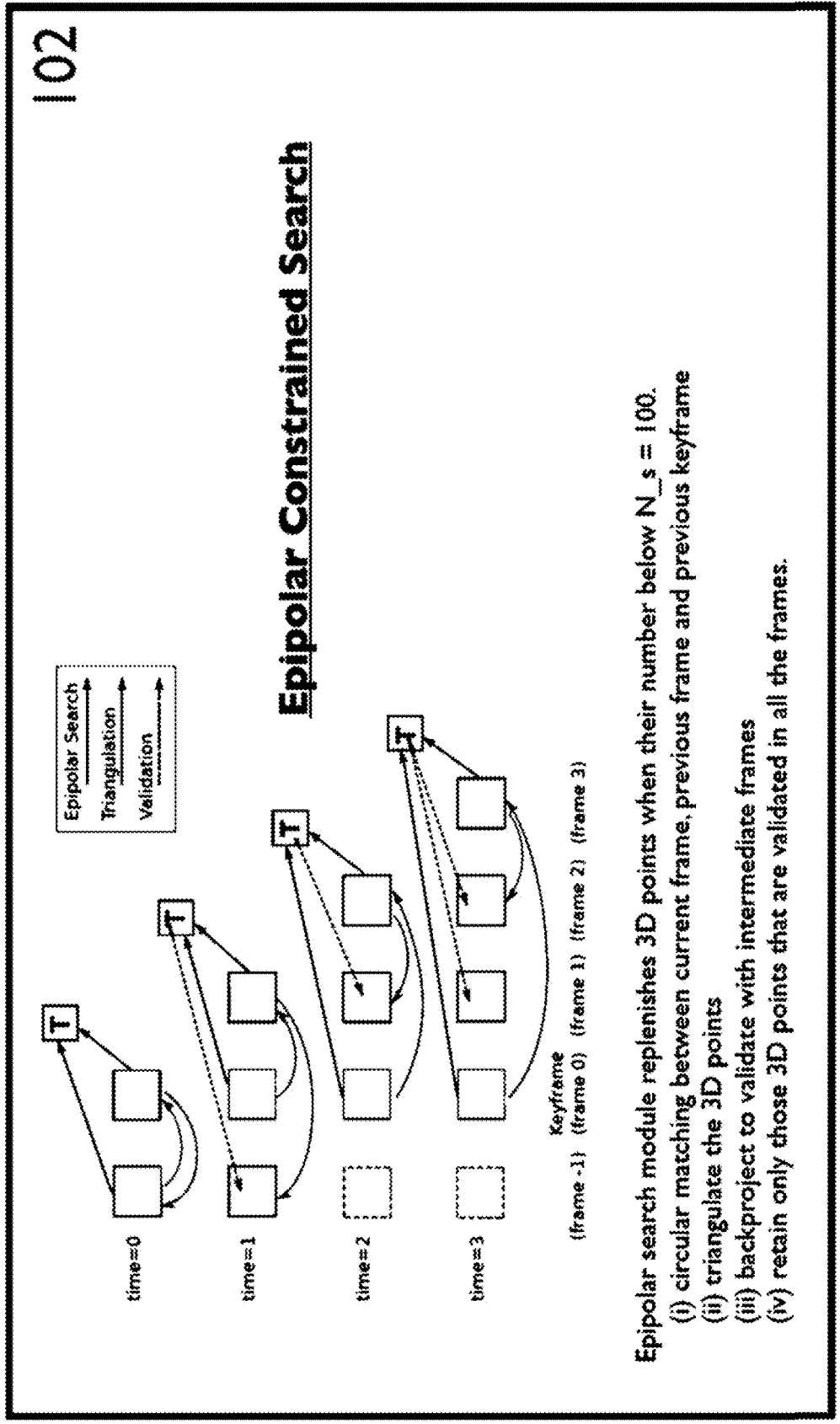
FIG. 4 shows an exemplary local bundle module, in accordance with the present principles.

FIG. 4 shows in more details the epipolar constrained search module 102. As depicted in FIG. 4, the epipolar search module is parallelized across two threads and follows pose estimation at each frame. The mechanism for epipolar search is illustrated in FIG. 2. Let the most recent prior keyframe be frame 0. After pose computation at frame n, for every feature $f_0$ in the keyframe at location $(x_0, y_0)$, the system considers a square of side $2r_e$ centered at $(x_0, y_0)$ in frame n. The system considers the intersection region of this square with a rectilinear band p pixels wide, centered around the epipolar line corresponding to $f_0$ in frame n. The ORB descriptors for all FAST corners that lie within this intersection region are compared to the descriptor for $f_0$. The closest match, $f_n$, is found in terms of Hamming distance. This epipolar matching procedure is also repeated by computing the closest match to $f_n$ in frame n−1, call it $f_{n-1}$. A match is accepted only if $f_{n-1}$ also matches $f_0$. Note that only two sets of matches with respect to frames (0,n) and (n−1,n) must be computed at the frame n, since the matches between (0,n−1) have already been computed at frame n−1.

In one embodiment, the parameter $r_e$ is automatically determined by the size of the motion, the system uses $r_e = \min\{1200\|\omega\|^2, 10\}$, where $\omega$ is the differential rotation between frames n−1 and n. Since pose estimates are highly accurate due to continuous refinement by bundle adjustment, epipolar lines are deemed accurate and a stringent value of p=3 can be used to impose the epipolar constraint. The Hamming distance computation for 256-bit ORB descriptors in a region of interest is performed as a block, with a fast SSE implementation. To rapidly search for features that lie within the above region of interest, the detected features in an image are stored in a lookup table data structure. The key into the table is the column index of the feature and within each bucket, features are stored in sorted row order. Across two threads, this allows circular matching for a triplet of images, with up to 500 features in each, in 10-15 ms. As opposed to brute-force searching, the lookup table results in speedups by up to a factor of 10, especially in the autonomous driving application where the images traditionally have wide aspect ratios (to cover greater field of view while limiting uninformative regions like sky).

In an exemplary illustrative embodiment, let there be k ORB descriptors in region of interest. These are arranged into 256×k matrix. Any ORB descriptor to be matched is compared to the columns of this matrix by calculating the magnitude of their differences and the closest column is deemed the match. The speed of this operation is increased, and the processing requirements for performing the operation is achieved by an SSE implementation being performed in accordance with various embodiments of the present principles. SSE refers to Streaming SIMD Extensions, for fast computation using machine level instructions.

The features that are circularly matched in frame n are triangulated with respect to the most recent keyframe (frame 0). This two-view triangulation requires approximately 2 ms per frame. The reconstructed 3D point is back-projected in all the frames 1, . . . , n−1 and is retained only if a matching ORB descriptor is found within a very tight square of side $2r_b$ pixels (set $r_b$=3). This acts as a replacement for a more accurate, but expensive, multiview triangulation and is satisfactory since epipolar search produces a large number of 3D points, but only the most reliable ones may be used for pose estimation. However, these 3D points are not added to the stable point cloud yet. For that they must first undergo a local bundle adjustment and be collected by the main thread at a keyframe, which are aspects explained in the following sections.

The epipolar constrained search is implemented on a thread of its own to produce per-frame 2D-2D correspondences. For current frame n, only 3D points that are validated against all frames 1 to n−1 are retained. Only persistent 3D points that survive for greater than L frames may be collected by the next keyframe.

The advantage of the above approach is that the system can construct long tracks, so when new 3D points are inserted, they are guaranteed to be accurate. To boost robustness, each 3D point is validated against all the frames in real-time, while prior systems could only do this in computational off-cycles.

If the application scenario involves scenes where the set of 3D points being viewed remains unchanged, then the pose module by itself would be sufficient to maintain the camera pose over extended periods. However, in outdoor applications like autonomous navigation, 3D scene points rapidly move out of view within a few frames. Thus, the stable set of points used for pose computation must be continually updated, which is the task entrusted to the epipolar search module.

FIG. 5 shows an exemplary local bundle module 103. The local bundle adjustment refines cameras and 3D points. Data structures are implemented to collect and refine 3D points from the epipolar thread.

To refine camera poses and 3D points incorporating information from multiple frames, the system implements a sliding window local bundle adjustment, as described in further detail above. The key data structure is the local bundle cache, which is composed of a frame cache and a match cache. The frame cache stores feature locations, descriptors and camera poses from the most recent N frames. It also stores images for those N frames, for display and debugging purposes. In the system, N=10. The match cache is a list of tables, one element corresponding to each frame. The key into the table is the identity of a 3D point visible in the frame and the stored entries are the identities of the corresponding 2D features in various frames.

The local bundle adjustment module also has other functions. After bundle adjustment, the system has a chance to re-find lost 3D points using the optimized pose. Since the system spends considerable effort in maintaining a high-quality set of 3D points for pose computation, it is worthwhile to incur a small overhead to recover any temporarily lost ones (due to image artifacts like blur, specularities or shadows). In fact, a stable 3D point is permanently discarded only when its projection using the current pose falls outside the image boundaries. Since the bundle adjusted pose is highly accurate, the system can perform re-finding by matching ORB descriptors on FAST corners within a very tight square of side $2r_f$ pixels (with $r_f=10$). This ensures re-finding is rapidly achieved within 1 ms.

One implementation uses the publicly available SBA package for bundle adjustment. In parallel, the motion model for predicting the pose of the next frame is also updated in this module. In an exemplary illustrative embodiment, a motion model is in constant velocity. Let the current velocity in the motion model be v. Let the estimated camera position in the current frame be p and the previous frame be p'. Then, velocity v is replaced by the new estimate v=p−p' in accordance with the present principles. The timings for the parallel epipolar update and local bundle adjustment modules are summarized in Table 2, below:

TABLE 2

Epipolar update and local bundle timings in steady state (parallel modules)

| Module | Operation | Timing |
|---|---|---|
| 2*Epipolar Update | Constrained search | 10-15 ms |
|  | Triangulation | 1-3 ms |
| 3*Local Bundle | Windowed bundle adjustment | 10-20 ms |
|  | Re-find 3D points | 1 ms |
|  | Update motion model | 0 ms |

Figure 6:
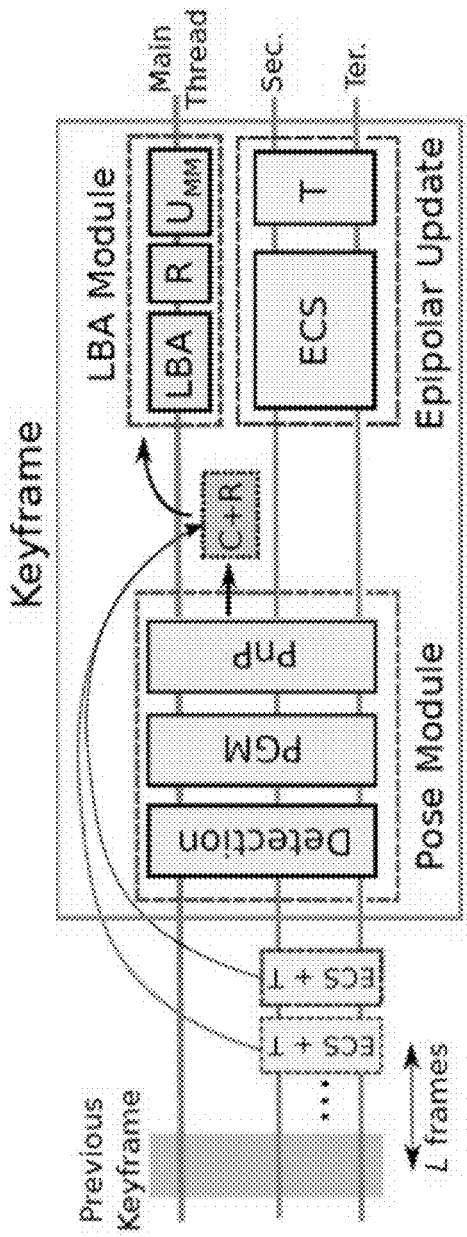
FIG. 6 shows an exemplary collection and refining module that allows bundle adjustment using long tracks, in accordance with the present principles.

FIG. 6 shows an exemplary multithreaded keyframe architecture 201 to handle insertion of new 3D points in the main thread. The system architecture for keyframes is similar to that of FIG. 1, with the addition of a collection and refinding module C+R. It collates persistent 3D points tracked over at least frames in the epipolar thread and re-finds them in the current frame using the output of the pose module. The LBA is now different from that for steady state, since its cache has been updated with 3D points and their corresponding 2D locations in all the relevant frames on the epipolar thread. In an illustrative exemplary embodiment, let the 3D points tracked for at least L frames be X. Let the current pose of the camera be P. The points X are projected to the current frame, as u=P*X ORB descriptors for the points X are compared to ORB descriptors of neighbors of u within a circular window of radius $r_c$, where $r_c=10$ pixels. Matches are deemed re-found points and added to the local bundle adjustment module in accordance with the present principles.

The system cannot maintain steady state indefinitely, since 3D points are gradually lost due to tracking failures or when they move out of the field of view. The latter is an important consideration in "forward moving" systems for autonomous driving (as opposed to "browsing" systems such as PTAM), so the role of keyframes is very important in keeping the system alive. The purpose of a keyframe is threefold:

Collect 3D points with long tracks from the epipolar thread, refine them with local bundle adjustment and add to the set of stable points in the main thread.

Trigger global bundle adjustment based on previous few keyframes that refines 3D points and keyframe poses.

Provide the frame where newly added 3D points "reside".

The modules that define operations at a keyframe are illustrated in FIG. 6. The pose module remains unchanged from the steady state. It is followed by a collection stage, where 3D points triangulated at each frame in the epipolar thread are gathered by the main thread. Only persistent 3D points that stem from features matched over at least L frames are collected (our circular matching for epipolar search ensures this is easily achieved by seeking 3D points only from at least L frames after the previous keyframe). Note that this mechanism imposes two necessary conditions for a point to be considered for inclusion into the stable set—it must be visible in at least two keyframes and must be tracked over at least L frames. While stringent, these conditions inherently enhance the chances that only reliable 3D points are added into the main thread. In the system, L=3 regardless of environment.

The collected 3D points must reside on a keyframe for all subsequent operations, so a re-finding operation is performed by projecting them using the estimated pose for the frame and finding the best ORB match in a circular region of radius 10 pixels. Now the existing stable 3D points, the collected 3D points from the epipolar thread, their projections in all the frames within the local bundle cache and the corresponding cameras undergo local bundle adjustment. ORB descriptors and matching are described in detail above. In one illustrative exemplary embodiment, let there be k ORB descriptors in region of interest. These are arranged into 256×k matrix. Any ORB descriptor to be matched is compared to the columns of this matrix by calculating the magnitude of their differences and the closest column is deemed the match in accordance with the present principles.

The bundle adjustment at keyframes differs from steady state operation, but adding long tracks into the bundle adjustment at keyframes is a reason the system can avoid more expensive multiview triangulation at each frame in the epipolar thread. The refined 3D points are now ready to be added to the stable set.

Figure 7:
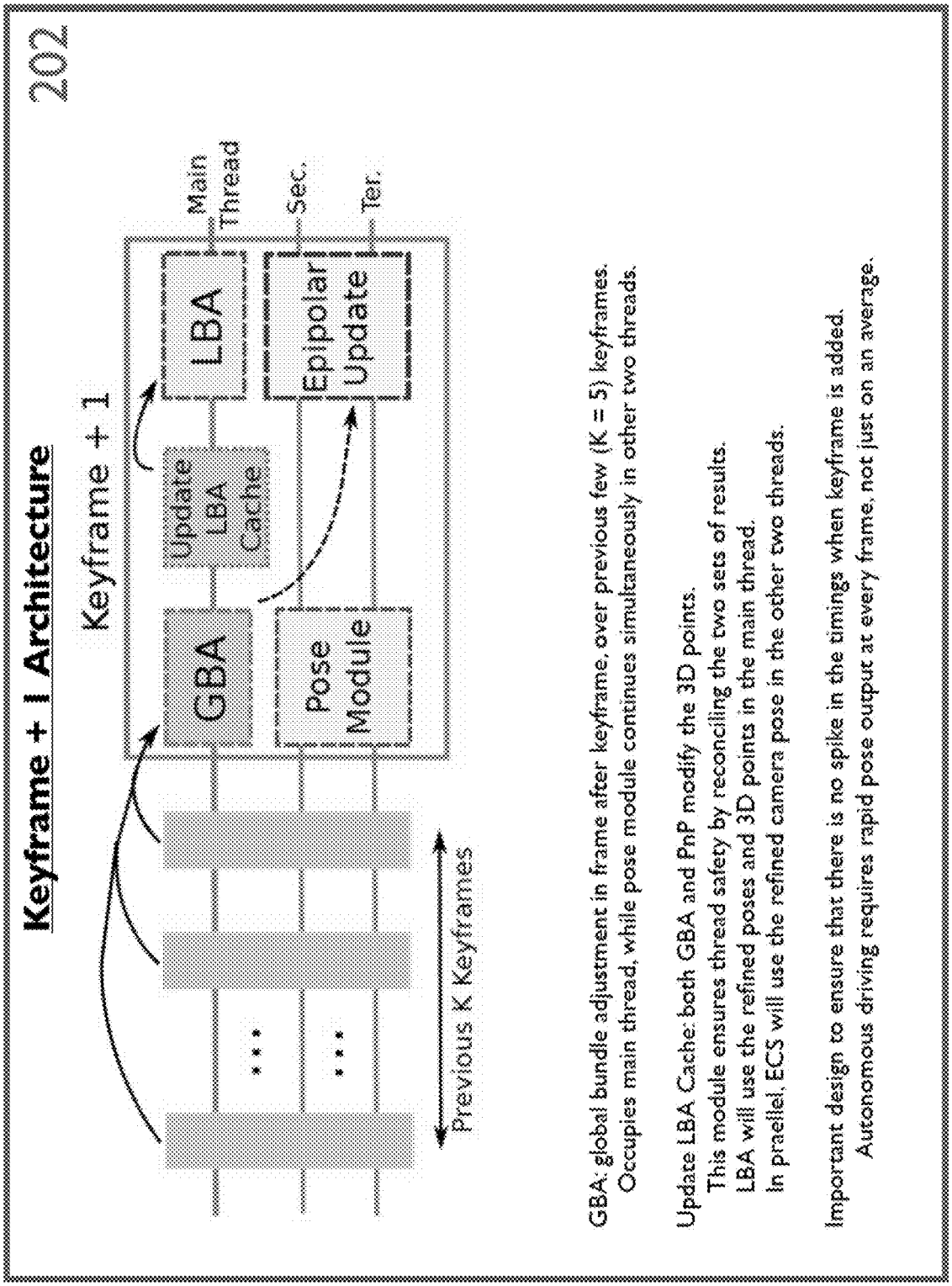
FIG. 7 shows an exemplary real-time global bundle adjustment module in a thread-safe architecture with real-time pose estimation, in accordance with the present principles.

The modules that define operations at the frame immediately after a keyframe are illustrated in FIG. 7. The pose module re-finds the (new) set of stable 3D points. The pose module is now split across only two threads, in order to accommodate a global bundle adjustment in the main thread. This bundle adjustment involves the previous K keyframes and their associated 3D points, in order to introduce long-range constraints to better optimize the newly added set of 3D points. For the system, choosing K=5 allows the global bundle adjustment to finish within 15 ms. There are two reasons a more expensive bundle adjustment involving a much larger set of previous keyframes (or even the whole map) is not necessary to refine 3D points with long-range constraints. First, the imagery in autonomous driving applications is fast moving and does not involve repetitions, so introducing more keyframes into the global bundle adjustment yields at best marginal benefits. Second, the goal is instantaneous pose output rather than map-building, so even keyframes are not afforded the luxury of delayed output. This is in contrast to parallel systems like where keyframes may produce a noticeable spike in the per-frame timings. In various embodiments, long-range constraints can mean, for example, using feature tracks that are several frames long, using information from several frames in the past (which might not observe the same points as the current frame, but are related through a series of points that might be shared between consecutive frames), etc., in accordance with the present principles.

In FIG. 7, the previous K frames are provided to a GBA or global bundle adjustment unit. The GBA unit usually finishes within the time consumed by the pose module. The cache update module reconciles the 3D points modified by both PnP and GBA, before it is used by LBA. Following global bundle adjustment, the 3D coordinates of all the points are updated. Note that overlapping sets of 3D points are used by both global bundle adjustment and pose modules in parallel, however, both may also cause this set to change (PnP may reject 3D points that are outliers, while bundle adjustment may move the position of 3D points). To ensure thread safety, an update module is included that reconciles changes in the 3D point cloud from both the prior parallel modules. The local bundle adjustment module, which simply reads in 3D point identities, receives this updated set for optimization based on the N frames in the local bundle cache. In parallel with local bundle adjustment, the epipolar search also makes use of the updated keyframe pose. While the keyframe pose has seen a global bundle adjustment, the pose of the subsequent frame has not. This does not cause any inconsistency in practice since poses tend to be much more stable than points—a camera is constrained by hundreds of points, but a point is visible only in a few cameras. Thereafter, the system resumes steady-state operation until the next keyframe, unless a recovery or firewall condition is triggered. The following sections explain those concepts in detail. In some embodiments, the closest ORB descriptor for 3D points output by the Pose Module is found among the 3D points output by GBA Module. The coordinates of those Pose Module points that have a close match among GBA points are replaced by the coordinates of the corresponding GBA point in accordance with the present principles.

In some embodiments, on rare occasions, the system might encounter a frame where pose-guided matching fails to find any features (due to imaging artifacts or a sudden large motion). In such a situation, a recovery mode is triggered in accordance with the present principles. For example, let the frame where system recovery initiates be n and let k be the immediately preceding keyframe. During recovery, the frames (n, n−1) are matched by comparing ORB descriptors over the entire image using fast LSH and accepting only bidirectional matches. Relative pose is computed using a 5-point algorithm in a robust RANSAC framework and inlier matches are triangulated. However, scale information is lost in the process. So, we also consider 3D points observed between frames (n−1, k). Both the sets of 3D points are moved to the coordinate system of frame n−1 and a 1-point RANSAC is performed. The hypothesis for the RANSAC is the ratio of the norms of the sampled 3D point in the two sets. The corrected scale factor between frames (n, n−1) is assigned as the average ratio in the largest consensus set. To ensure that 3D points used for scale recovery are as accurate as possible, two instances of bundle adjustments are run in parallel—one between frames (n, n−1) and another between frames (n−1, k).

In some embodiments, the system is configured to iteratively keep repeating the recovery mechanism until a stable set of 3D points is found. In our experiments, the system and method according to the present principles recovers a stable set of 3D points after only one frame of recovery. For sequences in the KITTI dataset, recovery is required on an average once in 1500 frames.

It is well-known that scale drift is a significant problem in monocular visual odometry. As discussed previously, using global knowledge of the trajectory for scale correction, such as loop closure, is not an option for practical autonomous driving applications. Instead, we use the fact that the camera is mounted a fixed height above the road plane. Unlike prior methods, we expect our system to be accurate enough to be able to hold scale for extended periods, so while we compute scale against the ground at every frame, the scale correction mechanism is triggered sparingly. The system according to the present principles automatically determines when scale correction may be required—in practice, once in approximately 100 frames. Not requiring per-frame scale correction also ensures that the system is able to tide over regions where the road surface may not be planar.

In one embodiment, our scale detection is implemented in a separate thread. At every frame, we consider a small region of interest closest to the car (mid-section of the lower half of the image). Features within this region that can be matched to the previous frame are triangulated. We are constrained to using this narrow baseline since matching is harder on low-textured roads and the features in this region of interest rapidly move out of the field of view. A 3-point RANSAC is used to find the best-fitting plane to these triangulated points and the distance of the plane to the camera is computed as $h_1$. If the known height of the camera mounting is $h_0$ the scale correction factor is $$s_1 = \frac{h_0}{h_1}.$$

However, since the 3D points are triangulated from a small baseline, we cannot rely on $s_1$ always being accurate. So, an alternative mechanism is also considered that does not require triangulation. We compute the planar homography between the set of road points in the two frames, using a 4-point RANSAC where hypotheses are generated by linear estimation of algebraic error. This is followed by Levenberg-Marquardt based nonlinear optimization of the optimal symmetric reprojection error over the largest consensus set:

$$\min_H \sum_i \|x_i' - Hx_i\|^2 + \|x_i - H^{-1}x_i'\|^2,$$

where H is the planar homography that maps homogeneous inlier point set x in the previous frame to the corresponding set $x^1$ in the current frame. The form of the homography H is:

$$H = R + \frac{1}{h_2}tn^T,$$

where (R, t) is the relative pose, n is the unit normal of the proposed ground plane and $h_2$ is the distance of the plane from the camera. The height $h_2$ may be recovered from H using a singular value decomposition of $H^TH$. Again, the scale factor may be computed as the ratio $$s_2 = \frac{h_0}{h_2}.$$

Having computed $s_1$ and $s_2$ at current frame k, we compare their values and consider them in mutual agreement when they differ by less than 5%. When in mutual agreement, the points in consideration actually belong to a planar ground and a potential scale factor, $s_k$=mean($s_1$, $s_2$), is available. If $|s_k-1|>0.1$, the system polls for scale correction. First, it seeks to confirm the computed scale $s_k$ by verifying that the previous mutually agreed scale factor was within 5% of $s_k$. If not, it waits for the next mutually agreed scale factor to confirm $s_k$. Once confirmed, the system inserts a firewall whereby the 3D points and camera poses in the bundle cache are scale corrected. The frames preceding the bundle cache are now fixed and play no further part in future estimation (in effect, their data structures are emptied). The ground detection and firewall estimation require about 30 ms in accordance with various embodiments of the present principles.

Figure 11:
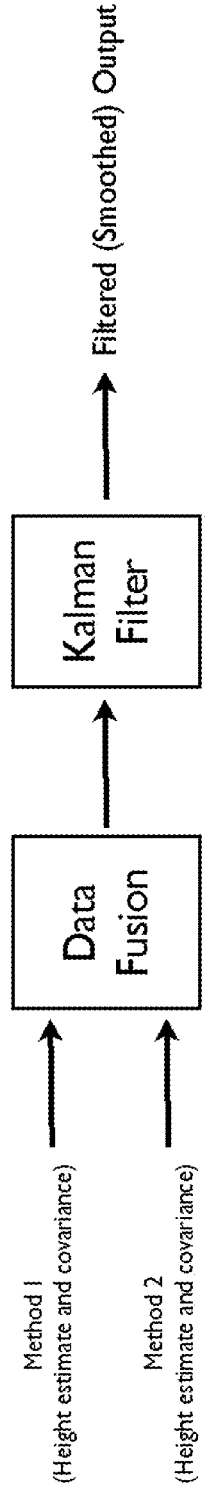
FIG. 11 shows an exemplary process for scale correction, in accordance with the present principles.

FIG. 8 shows in more details a process for ground plane estimation with 3D points 301. FIG. 9 shows an exemplary process for ground plane estimation with guided dense stereo. FIG. 10 shows an exemplary process for real-time lane detection, and FIG. 11 shows an exemplary process for scale correction.

Since scale information is lost in monocular SFM, an integral component of monocular visual odometry is scale correction. Traditional methods for scale correction include loop closure and estimating the height of the ground plane. For autonomous driving applications, since loop closure is an unlikely scenario, the latter method is used. The KITTI dataset provides the ground truth mounting of the camera height as 1.70 meters, with a camera pitch angle of $\theta=-0.03$ radians. Multiple methods are used for ground plane estimation and a principled approach is used to combine the cues using a Kalman filter, whose process covariances are rigorously learned from training data.

A Plane-guided Dense Stereo technique is used. The system assumes a region in the foreground (middle fifth of the lower third of the image) to be the road plane. For a hypothesized value of (h,n), the stereo cost function computation determines the homography mapping between frames k and k+1 as $$G = R + \frac{1}{h} t n^T.$$

Pixels in frame k+1 are mapped to frame k and the sum of absolute differences (SAD) is computed over bilinearly interpolated image intensities. A Nelder-Mead simplex routine is used to estimate the (h,n) that minimize this cost function. Note that the optimization only involves the three variables h, $n_1$ and $n_3$, since $\|n\|=1$.

Triangulated 3D Points are also used. The system considers matched SIFT descriptors between frames k and k+1, computed within the above region of interest (ORB descriptors are not powerful enough for the low texture in this region). To fit a plane through the triangulated 3D points, one option is to estimate (h,n) using a 3-point RANSAC for plane-fitting, however, better results are obtained by assuming the camera pitch to be fixed at $\theta$. For every triangulated 3D point, the height difference $\Delta h$ is computed with respect to every other point. The estimated ground plane height is the height of the point that maximizes the score $$q = \sum_{i=1}^{n} e^{-\mu \Delta h}, \text{ where } \mu = 50. \tag{1}$$

To combine the height estimates from various methods, a natural framework is a Kalman filter. The system performs a rigorous training to compute the involved covariances. The Kalman filter model of state evolution is given by $$x_k = A x_{k-1} + w_{k-1}, p(w): N(0,Q), \tag{2}$$

$$z_k = H x_k + v_{k-1}, p(v): N(0,U), \tag{3}$$

where x is the state variable, z the observation, while Q and U are the covariances of the process and observation noise, respectively, that are assumed to be zero mean multivariate normal distributions. In one case, state variable is simply the equation of the ground plane, thus, $x=(n_1,n_2,n_3,h)^T$. Since $\|n\|=1$, $n_2$ is determined by $n_1$ and $n_3$ and the observation is $z=(n_1,n_3,h)^T$. Thus, the state transition matrix and the observation model are given by $$A = \begin{bmatrix} R & t \\ 0^T & 1 \end{bmatrix}^T, \quad H = \begin{bmatrix} 1 & 0 & 0 & 0 \\ 0 & 0 & 1 & 0 \\ 0 & 0 & 0 & 1 \end{bmatrix}. \tag{4}$$

where w is noise in state variable, v is noise in observation variable, N stands for Gaussian distribution, n is the surface normal of the ground plane, R is camera rotation, t is camera translation, and A is the matrix constructed as shown above.

If methods $j=1, \ldots, m$ are used for estimating the ground plane, each with its observation covariance $U_j$. Then, with $U_k^{-1} = \sum_{j=1}^{m} U_{j,k}^{-1}$, the fusion equations at time instant k are $$z_k = U_k \sum_{j=1}^{m} U_{j,k}^{-1} z_{j,k}, \quad H_k = U_k \sum_{j=1}^{m} U_{j,k}^{-1} H_k. \tag{5}$$

Meaningful estimation of $U_k$ at every frame, with the correctly proportional $U_{j,k}$ for each cue, is essential to the success of a Kalman filter-based cue combination. In the following, a comprehensive training procedure estimates the various observation covariances. In some embodiments, cues may be, for example, plane-guided dense stereo and triangulated 3D points, described in further detail above.

For Dense Stereo, the system makes the approximation that state variables are uncorrelated. The system first fixes the values of $n_1$ and $n_3$ to the optimal values from dense stereo and for a range of h, then constructs the homography mapping from frame k to k+1, given by $$R + \frac{1}{h} t n^T.$$

For each homography mapping, the system computes the SAD score corresponding to the road region using bilinearly interpolated image intensities and consider the value $s=1-\eta^{-SAD}$, where $\eta=1.5$. A univariate Gaussian is now fit to the distribution of s and the variance $\sigma_k^s$ is recorded (a different $\sigma^s$ is computed for h, $n_1$ and $n_3$).

For each frame, let $e_k^s$ be the error of the ground plane height estimated from dense stereo alone. Then, the system considers the histogram of $e_k^s$ with B=1000 bins over the variances $\sigma_k^s$, with the bin centers positioned to match the density of $\sigma_k^s$ (that is, distribute roughly F/B error observations within each bin). The variances $\sigma_e^s$ corresponding to the $e^s$ are computed within each bin $b=1, \ldots, B$ and a curve is fitted to the distribution of $\sigma_e^s$ versus $\sigma^s$. Empirically, a straight line suffices to produce a good fit. A similar process is repeated for $n_1$ and $n_3$.

During testing when the Kalman filter is in operation, the system fits a 1D Gaussian to the homography-mapped SAD scores to get the value of $\sigma^s$, corresponding to h, $n_1$ and $n_3$. Using the line-fit parameters estimated above, the system can predict the value of $\sigma_e^s$. The covariance matrix for the dense stereo method is now available as $U_1 = \text{diag}(\sigma_e^s(n_1), \sigma_e^s(n_3), \sigma_e^s(h))$.

The covariance estimation for the method that uses triangulated 3D points differs from the stereo method, since the normal n is assumed known from the camera pitch and only the height h is an estimated entity. During training, for various trial values of h at frame k, the system computes the height error $e_k^p$ with respect to the ground truth and the sum q defined in (1). As in the case of dense stereo, a histogram is computed for the with B=1000 bins and approximately F/B observations of are recorded at each bin, centered at $q_b$, for b=1, ..., B.

Since $n_1$ and $n_3$ are fixed to values from camera pitch angle, fixed variance estimates $\sigma^p(n_1)$ and $\sigma^p(n_3)$ are computed for them, as the variance of the errors in $n_1$ and $n_3$ with respect to ground truth. During testing, the value of q is computed by the ground plane estimation using (1) and the corresponding value of $\sigma^p(h)$ is estimated from the above line-fit. The covariance matrix for this method in the Kalman filter data fusion is now available as $U_2=\text{diag}(\sigma^p(n_1),\sigma^p(n_3),\sigma^p(h))$.

The multithreaded system enables large-scale, real-time, monocular visual odometry, targeted towards autonomous driving applications with fast-changing imagery. The multithreaded design can boost both the speed and accuracy for handling challenging road conditions. The system is optimized to provide pose output in real-time at every frame, without delays for keyframe insertion or global bundle adjustment. This is achieved through a per-frame epipolar search mechanism that generates redundantly validated 3D points persistent across long tracks and an efficient keyframe architecture to perform online thread-safe global bundle adjustment in parallel with pose computation. Further, the system is accurate enough to require only occasional scale correction, for which an automatic mechanism is provided that detects planarity of the ground to compute reliable scale factors. Multithreaded bundle adjustment can be optimized for small-sized problems that arise in autonomous driving applications. Real-time detection of pedestrians and cars can also be done for better handling of crowded scenes in accordance with various embodiments of the present invention.

In some embodiments, the present system accepts images as input and outputs the motion of the camera (e.g., single camera). This can be used to localize an autonomous driving car, with respect to a global coordinate system defined by a map. Using this self-localization, the landmarks and/or road layout in the vicinity of the car is determined in accordance with the present principles. This is used by the autonomous driving car to determine and execute appropriate actions (e.g., steering, braking, etc.). It can also be used to determine the determine the distance of other objects in the scene, and for applications such as collision avoidance in accordance with the present principles.

In accordance with various embodiments of the present principles, multithreading enables splitting computations into parallel threads, which results in faster computation speed and lower memory and processor requirements. The present invention provides an extensive redesign and novel components in a structure from motion pipeline, which enables improvements in speed and decreased processing requirements, with increased accuracy as compared to conventional systems and methods. Multithreading also enables novel modules such as, for example, the epipolar update module, whose epipolar constrained search functionality leads to higher accuracy since it can generate a set of high-quality matches with extensive verification, in parallel to pose computation, in accordance with the present principles.

To further illustrate the advantages of the present system and method in, for example, autonomous driving application, we present experimental results on the state-of-art KITTI dataset, which is collected in real-world driving situations and provides ground truth for evaluation. The sequences vary in length from a few hundred meters to several kilometers, covering urban, residential, countryside and highway roads. Vehicle speeds range from 0 to 60 kmph at a relatively low frame rate of 10 Hz, which results in large inter-frame motions. Several instances of standing still and frequent presence of other vehicles, bicycles and pedestrians add to the complexity. The evaluation metrics are provided by Geiger et al., based on an extension of those proposed by Kümmerle et al. Rotation and translation errors are reported as averages of all relative transformations at a fixed distance, as well as functions of various subsequence lengths and vehicle speeds. For timings, our experiments are performed on a laptop with Intel Core i7 2.40 GHz processor with 8 GB DDR3 RAM and 6M cache. The main modules occupy three parallel threads as describe above with respect to FIG, while ground detection for scale correction occupies a thread of its own.

We compare the performance of our system to state-of-the-art stereo and monocular systems associated with the dataset, namely VISO2-S and VISO2-M. Rotation and translation errors relative to ground truth, averaged over all subsequence lengths and vehicle speeds, are presented in Table 3, below:

TABLE 3

Comparison of Rotation and Translation Errors

| Sequence | VISO2-S (Stereo) | | VISO2-M (Mono) | | Present Invention (Mono) | |
| --- | --- | --- | --- | --- | --- | --- |
| | Rot (deg/m) | Trans (%) | Rot (deg/m) | Trans (%) | Rot (deg/m) | Trans (%) |
| 00 | 0.0183 | 1.71 | 0.0369 | 12.62 | 0.0142 | 7.14 |
| 02 | 0.0111 | 1.58 | 0.0194 | 3.71 | 0.0097 | 4.34 |
| 03 | 0.0127 | 1.81 | 0.0288 | 9.05 | 0.0093 | 2.90 |
| 04 | 0.0097 | 1.21 | 0.0163 | 7.58 | 0.0064 | 2.45 |
| 05 | 0.0160 | 1.35 | 0.0575 | 12.74 | 0.0107 | 8.13 |
| 06 | 0.0107 | 1.11 | 0.0275 | 3.71 | 0.0108 | 7.56 |
| 07 | 0.0256 | 1.72 | 0.1235 | 25.77 | 0.0234 | 9.92 |
| 08 | 0.0155 | 2.15 | 0.0369 | 16.88 | 0.0122 | 7.29 |
| 09 | 0.0126 | 1.57 | 0.0227 | 3.94 | 0.0096 | 5.14 |
| 10 | 0.0119 | 1.16 | 0.0596 | 29.36 | 0.0121 | 4.99 |
| Avg | 0.0149 | 1.65 | 0.0381 | 11.53 | 0.0119 | 6.42 |

Note that the rotation performance of our system is excellent, resulting in error rates lower than even stereo in accordance with various embodiments of the present principles. The translation performance of our system is also significantly better than VISO2-M, resulting in error rates under 10% for all sequences except one (This one sequence has been omitted in the above table since it involves a long section on the highway at speeds 90 kmph recorded at only 10 Hz, causing all three systems to break down. Translation errors for the three systems are 8% and 33% and 34%, respectively. This is an artifact of the low frame rate of the acquisition, rather than an inherent limitation of the systems.

Note that images in this dataset are recorded at only 10 Hz, so it inherently favors systems such as VISO2-M [6] based on per-frame 2D-2D matching rather than those tracking 3D-2D correspondences. Nevertheless, our system is robust enough to still produce results that outperform all other state-of-the-art systems. During experiments, we compare the rotation and translation errors for the above systems across various subsequence lengths from 5 to 400 meters and speeds from 5 to 60 kmph. The plotted values are averages across all ten sequences in Table 3.

In accordance with the present principles, the recovered visual odometry path from our monocular system, overlaid with the ground truth, may be compared with conventional systems and methods. Such comparisons have shown the excellent rotation handling of our system, which manages to accurately recover the pose even through several tight rotations in many sequences in accordance with various embodiments. The translational error is also small and in most cases, occurs due to difficult imaging conditions at a few isolated frames.

To illustrate our assertion that the system returns real-time pose at an average of 30 fps and a worst-case timing of 50 ms per frame, the timing graphs of the system on two sequences were analyzed. In particular, note that the insertion of keyframes, triggering bundle adjustments or error-correcting mechanisms do not result in significant spikes in our timings, which is in contrast to several contemporary real-time systems.

It has also been observed that keyframes are inserted once in about 5 and 6 frames for sequences 08 and 05, respectively. This is expected since a fast moving vehicle will demand new 3D points from the epipolar update module at frequent intervals. It does not affect the performance of our system negatively since the global bundle adjustment triggered after a keyframe finishes before the next frame's pose computation and runs in parallel to it. In fact, keyframe insertion in accordance with the present principles provides an opportunity to introduce long-range constraints in the optimization (so long as the epipolar update module can return long enough tracks). Thus, to ensure increased speed and accuracy over conventional systems and methods, it is crucial for a multithreaded visual odometry system to not only have a well-designed keyframe architecture, but also to have its various modules like pose estimation, epipolar search and various bundle adjustments operating in optimal conjunction with each other in accordance with various embodiments of the present principles. Also note that scale correction may be performed once every approximately 100 frames for the sequences shown in Table 3. This illustrates our observations that the proposed system is accurate enough to hold scale for extended periods and that we use local planarity information when available and appropriate, rather than enforcing it as a hard assumption.

Figure 12:
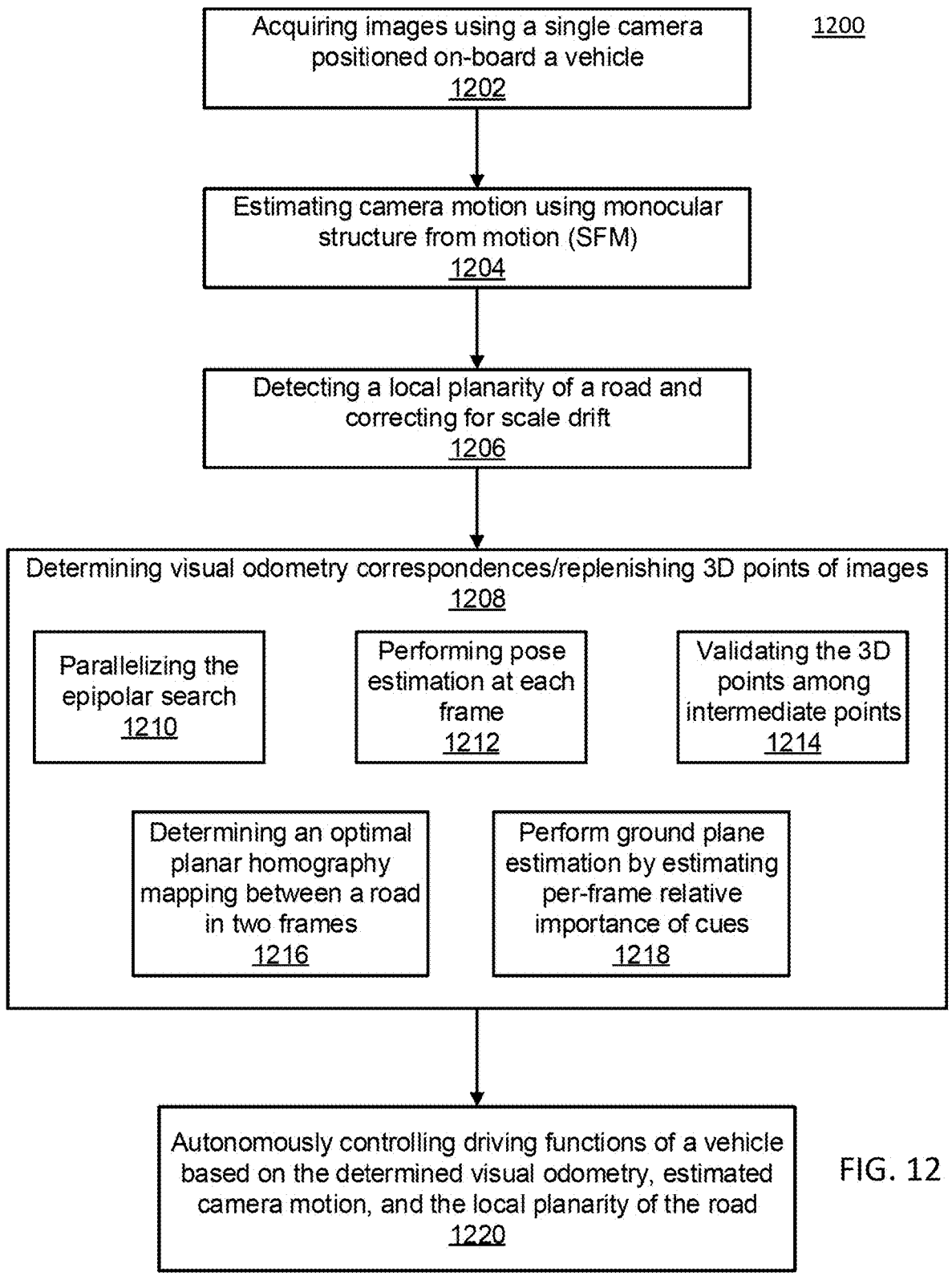
FIG. 12 is a block/flow diagram illustrating a method for autonomously driving a vehicle, in accordance with the present principles.

Referring now to FIG. 12, a block/flow diagram showing a high-level method 1200 for autonomously driving a vehicle, using a processor coupled to a computer-readable storage medium, is illustratively depicted in accordance with an embodiment of the present principles.

In one embodiment, autonomous navigation of a vehicle is performed by first acquiring images using a single camera positioned on-board a vehicle in block 1202. Camera motion is estimated using monocular structure from motion (SFM) by performing continuous camera pose estimation of 2D-3D correspondences in block 1204. In block 1206, a local planarity of a road is detected and corrected for scale drift based on the camera pose estimation. In block 1208, visual odometry correspondences are determined and 3D points of the images are replenished by combining the pose estimation with a 2D-2D multi-threaded epipolar search.

The determining of visual odometry in block 1208 also may include parallelizing the epipolar search across a plurality of threads in block 1210, performing, in real-time, the pose estimation at each of a plurality of frames using all of the threads in block 1212, validating the 3D points among intermediate points and retaining validated 3D points for insertion of new 3D points in a main thread in block 1214, determining an optimal planar homography mapping between a road in two frames based on one or more determined ground estimation cues in block 1216, and estimating per-frame relative importances of the cues by computing observation covariances for each of the cues to perform ground plane estimation in block 1218 in accordance with the present principles. In block 1220, the driving functions (e.g., acceleration, steering, braking, turn signaling, etc.) of the vehicle are then autonomously controlled based on the determined visual odometry and the local planarity of the road to navigate the vehicle (e.g., on a road, dirt track, field, etc.), including providing object detection and avoidance, in accordance with various embodiments of the present invention.

Figure 13:
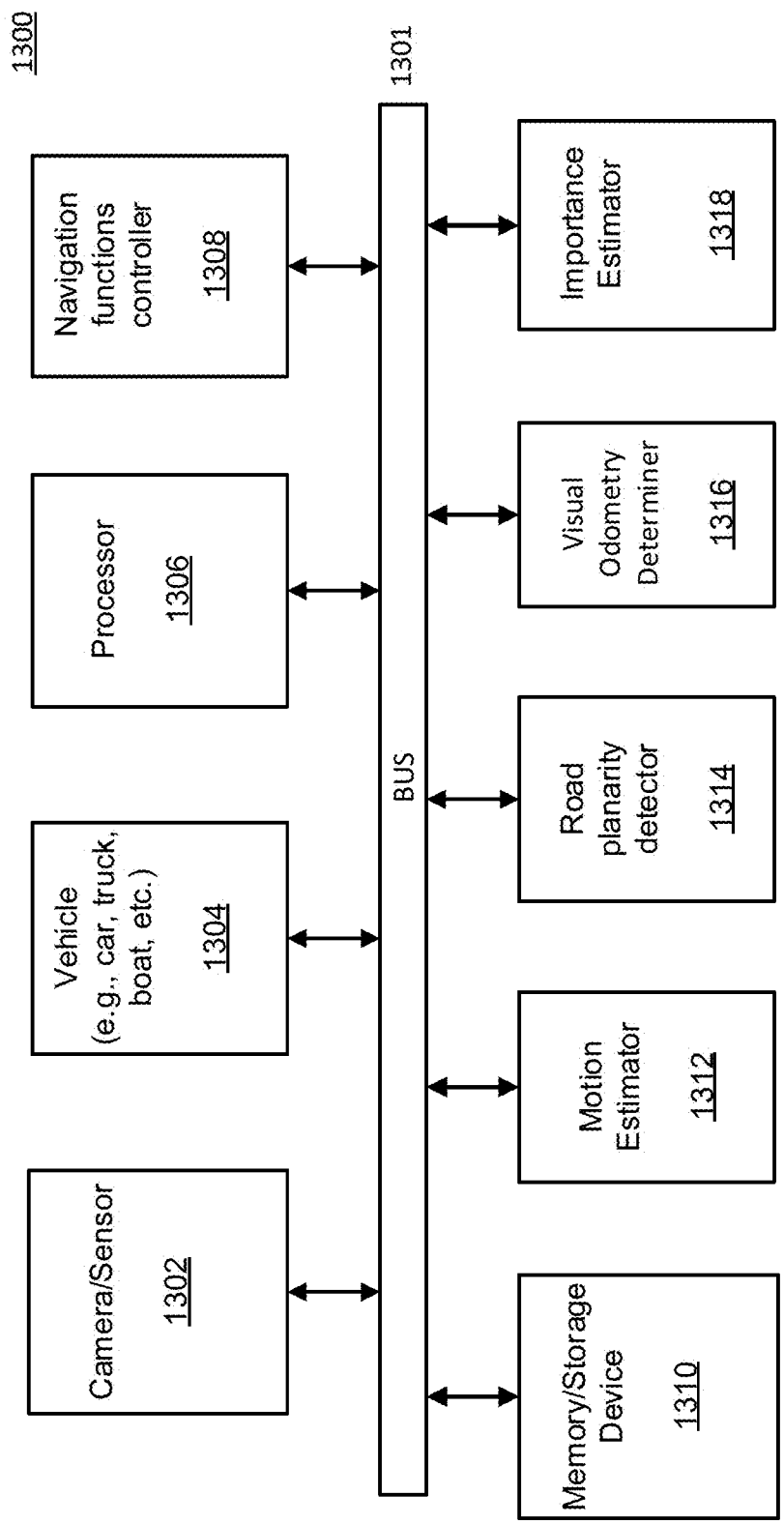
FIG. 13 is a block/flow diagram illustrating a system for autonomously driving a vehicle, in accordance with the present principles.

Referring now to FIG. 13, a system 1300 for autonomously navigating a vehicle is illustratively depicted in accordance with an embodiment of the present principles. In one embodiment, the system 1300 includes a multithreaded processor 1306 operatively coupled to a non-transitory computer-readable storage medium 1310 (e.g., memory, persistent storage device, etc.), which are configured to control navigation (e.g., steering, braking, etc) of a vehicle 1304 using an automatic vehicle navigation functions controller 1308 in accordance with various embodiments of the present principles.

A single camera 1302 may be positioned on-board a vehicle, and configured to acquire images and/or sense road conditions, planarity of the road, obstacles, etc. in accordance with various embodiments. A motion estimator 1312 may estimate camera motion using monocular structure from motion (SFM) by performing continuous camera pose estimation of 2D-3D correspondences. A road planarity detector 1314 may detect a local planarity of a road and correcting for scale drift based on the camera pose estimation;

In some embodiments, a visual odometry determiner 1316 is configured for determining visual odometry correspondences and replenishing 3D points of the images by combining the pose estimation with a 2D-2D multi-threaded epipolar search. The visual odometry determiner 1316 is further configured for parallelizing the epipolar search across a plurality of threads, performing, in real-time, the pose estimation at each of a plurality of frames using all of the threads, validating the 3D points among intermediate points, retaining validated 3D points for insertion of new 3D points in a main thread, and determining an optimal planar homography mapping between a road in two frames based on one or more determined ground estimation cues, in accordance with the present principles. A per-frame relative importance estimator 1318 may be employed for estimating per-frame relative importances of the cues by computing observation covariances for each of the cues to perform ground plane estimation. A controller 1308 is configured for autonomously controlling driving functions of the vehicle based on the determined visual odometry and the local planarity of the road in accordance with the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system for autonomous vehicular navigation using a multithreaded monocular structure from motion (SFM) architecture, comprising:
a single camera positioned on-board a vehicle; and
a multithreaded processor coupled to the single camera and a non-transitory computer-readable storage medium, the multithreaded processor being included in the multithreaded SFM architecture, and being configured for:
acquiring images using the single camera positioned on-board the vehicle;
estimating camera motion using monocular SFM by performing continuous camera pose estimation of 2D-3D correspondences;
detecting a local planarity of a road and correcting for scale drift using the monocular SFM based on the camera pose estimation;
determining visual odometry correspondences and replenishing 3D points of the images by combining the pose estimation with a 2D-2D multi-threaded per-frame epipolar search, the per-frame epipolar search continuously generating, for each frame, redundantly validated 3D points persistent across comparatively long tracks, the determining visual odometry further comprising:
parallelizing the epipolar search across a plurality of threads;
validating the 3D points among intermediate points, performing a local bundle adjustment, and retaining the validated 3D points for insertion of new 3D points at a keyframe in a main thread to frontload the validated 3D points for the pose estimation;
performing, in real-time, the pose estimation at each of a plurality of frames using only the validated 3D points to reduce processing requirements and increase processing speed of the pose estimation;
executing a real-time global bundle adjustment in a thread-safe architecture in parallel with the real-time pose estimation;
determining an optimized planar homography mapping between a road in two frames based on one or more determined ground estimation cues, the cues including triangulated sparse 3D points, inter-frame dense stereo matching, and a displacement computed based on a distance from a vanishing point; and
estimating per-frame relative importances of the cues by computing observation covariances for each of the cues and performing ground plane estimation by combining the triangulated sparse 3D points and cues using a Kalman filter; and
autonomously controlling driving functions of the vehicle based on the determined visual odometry and the local planarity of the road.

2. The system of claim 1, wherein the processor is further configured for providing fast 3D-2D correspondences using pose-guided matching.

3. The system of claim 1, wherein the processor is further configured for performing epipolar constrained search to produce per-frame 2D-2D correspondences.

4. The system of claim 1, wherein the processor is further configured for performing vanishing point detection to hypothesize a feature match search window along one or more radial lines from the VP for pruning mismatches due to repeated features.

5. The system of claim 1, wherein the processor is further configured for validating each 3D point against all frames in real-time, refining cameras and 3D points by the performing the local bundle adjustment, and collecting and refining 3D points from an epipolar thread.

6. The system of claim 1, wherein the processor is further configured for collecting and refinding to allow bundle adjustment using long tracks.

7. The system of claim 1, wherein the processor is further configured for performing real-time scale correcting by combining scale estimates from 3D points and planar homography mappings.

8. The system of claim 1, wherein the validating the 3D points provides increased accuracy and timing of the pose estimation based on the epipolar constrained search, triangulation and backprojection.

9. The system of claim 1, wherein the data-driven covariance learning comprises adapting the observation covariance on a per-frame basis by combining the cues triangulated sparse 3D points and homography-guided dense inter-frame stereo cues using a Kalman filter, where relative importance of cues is estimated on a per-frame basis learned through observation covariances.

10. A method for vehicular navigation using a multithreaded monocular structure from motion (SFM) architecture, comprising:
autonomously navigating a vehicle using a multithreaded processor coupled to a non-transitory computer-readable storage medium, the multithreaded processor being included in the multithreaded SFM architecture, and being configured for:
acquiring images using a single camera positioned on-board a vehicle;
estimating camera motion using monocular SFM by performing continuous camera pose estimation of 2D-3D correspondences;
detecting a local planarity of a road and correcting for scale drift using the monocular SFM based on the camera pose estimation;
determining visual odometry correspondences and replenishing 3D points of the images by combining the pose estimation with a 2D-2D multi-threaded per-frame epipolar search, the per-frame epipolar search continuously generating, for each frame, redundantly validated 3D points persistent across comparatively long tracks, the determining visual odometry further comprising:
parallelizing the epipolar search across a plurality of threads;
validating the 3D points among intermediate points, performing a local bundle adjustment, and retaining the validated 3D points for insertion of new 3D points at a keyframe in a main thread to frontload the validated 3D points for the pose estimation;
performing, in real-time, the pose estimation at each of a plurality of frames using only the validated 3D points to reduce processing requirements and increase processing speed of the pose estimation;

executing a real-time global bundle adjustment in a thread-safe architecture in parallel with the real-time pose estimation;

determining an optimized planar homography mapping between a road in two frames based on one or more determined ground estimation cues, the cues including triangulated sparse 3D points, inter-frame dense stereo matching, and a displacement computed based on a distance from a vanishing point; and estimating per-frame relative importances of the cues by computing observation covariances for each of the cues and performing ground plane estimation by combining the triangulated sparse 3D points and cues using a Kalman filter; and autonomously controlling driving functions of the vehicle based on the determined visual odometry and the local planarity of the road.

11. The method of claim 10, further comprising providing fast 3D-2D correspondences using pose-guided matching.

12. The method of claim 10, further comprising performing epipolar constrained search to produce per-frame 2D-2D correspondences.

13. The method of claim 10, further comprising performing vanishing point detection to hypothesize a feature match search window along one or more radial lines from the VP for pruning mismatches due to repeated features.

14. The method of claim 10, further comprising validating each 3D point against all frames in real-time, refining cameras and 3D points by the performing the local bundle adjustment, and collecting and refining 3D points from an epipolar thread.

15. The method of claim 10, further comprising collecting and refinding to allow bundle adjustment using long tracks.

16. The method of claim 10, further comprising performing real-time scale correcting by combining scale estimates from 3D points and planar homography mappings.

17. The method of claim 10, wherein the validating the 3D points provides increased accuracy and timing of the pose estimation based on the epipolar constrained search, triangulation and backprojection.

18. The method of claim 10, wherein the data-driven covariance learning comprises adapting the observation covariance on a per-frame basis by combining the cues triangulated sparse 3D points and homography-guided dense inter-frame stereo cues using a Kalman filter, where relative importance of cues is estimated on a per-frame basis learned through observation covariances.

* * * * *